No. 787,286. PATENTED APR. 11, 1905.
S. GALLOWAY.
BLANKET PIN.
APPLICATION FILED OCT. 28, 1904.

Witnesses

Inventor
S. Galloway.

Attorneys

No. 787,286. Patented April 11, 1905.

UNITED STATES PATENT OFFICE.

SAMUEL GALLOWAY, OF YALE, KANSAS.

BLANKET-PIN.

SPECIFICATION forming part of Letters Patent No. 787,286, dated April 11, 1905.

Application filed October 28, 1904. Serial No. 230,440.

*To all whom it may concern:*

Be it known that I, SAMUEL GALLOWAY, a citizen of the United States, residing at Yale, in the county of Crawford, State of Kansas, have invented certain new and useful Improvements in Blanket-Pins; and I do hereby declare the following to be a full, clear, and exact description of the invention, such as will enable others skilled in the art to which it appertains to make and use the same.

This invention relates to pins, and more particularly to safety-pins, and has for its object to provide a pin especially designed for pinning horse-blankets which will be simple of construction and cheap of manufacture.

Another object is to provide a pin which may be attached to one side of a blanket and which may be attached to the other side when desired without interfering with its attachment to the first-mentioned side, it being thus possible to secure a blanket in position during windy weather without fear of the pin being entirely detached from the blanket by the wind.

Other objects and advantages will be apparent from the following description, and it will be understood that modifications of the specific construction shown may be made and any suitable materials may be used without departing from the spirit of the invention.

Figure 1:
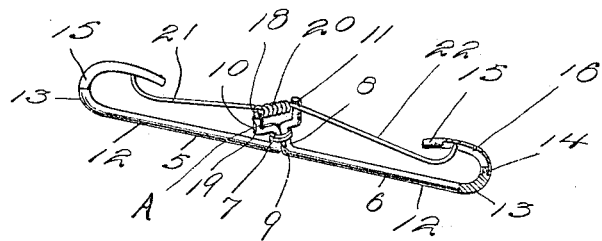
Figure 2:
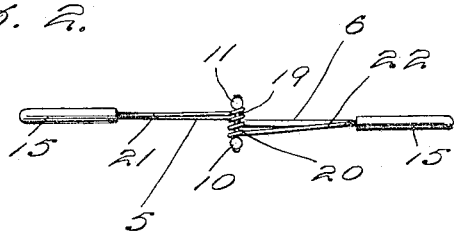
Figure 3:
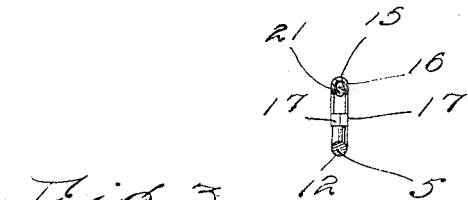

In the drawings forming a portion of this specification, and in which like characters of reference indicate similar parts in the several views, Figure 1 is a perspective view of the pin. Fig. 2 is a top plan view of Fig. 1. Fig. 3 is a sectional view of the hooked end of one of the members.

Referring now to the drawings, the present invention comprises two pieces of stiff wire or other suitable material 5 and 6, which are bent upwardly at their inner ends at right angles to form portions 7 and 8, and these portions are disposed side by side and throughout approximately the lower halves of their lengths are secured together by a wire 9 wrapped therearound and soldered thereto, the portions 7 and 8 being also soldered together. Adjacent to their centers the portions 7 and 8 are bent laterally and then upwardly to form spaced vertical portions 10 and 11, which occupy a plane extending at right angles to the central portions 12 of the wires 6 and 7, the portions 7 and 8 thus forming a bracket A. The portions 12 just mentioned lie between the upwardly-extending portions 7 and 8 and the outer extremities of the wires, these outer extremities being curved upwardly, as shown at 13, and, as illustrated, the portions 12 extend in opposite directions and are offset from each other. The ends of the upwardly-curved portions 13 are reduced, as illustrated at 14, and engaged with these reduced portions are the lower tubular ends of metallic fingers 15, which are curved inwardly and downwardly over the portions 12 in the direction of the portions 7 and 8, and in their faces which lie in the direction of the wires 5 and 6 the fingers 15 are provided with grooves 16.

The fingers 15 are preferably formed, as illustrated, from sheet-metal blanks bent longitudinally into arc shape, and having tabs 17 at opposite sides of one end which overlap to form the lower tubular portions of the fingers.

Formed through the portions 10 and 11 are alining perforations 18, and engaged at its ends in these perforations is a pin 19, upon which is mounted a helical spring 20, the ends of the wire of which it is formed extending at right angles thereto in opposite directions to form tongues 21 and 22, one of which lies above each of the portions 12.

The tongues 21 and 22 are curved downwardly in the direction of the portions 12 and then upwardly and lie with their free ends in the grooves 16 of the fingers 15, these free ends being sharpened, as illustrated. As shown, the tongues are spaced from the free ends of the fingers 15 and from the portions 12 and when it is desired to engage a blanket with the device an edge of the blanket is passed between one of the tongues and the end of the adjacent finger 15, which moves the tongue downwardly and disengages the sharpened end from the groove of the finger, when the blanket may be further moved to bring its edge beyond the end of the tongue. When this is done, the tension of the spring 20 will force the sharpened end of the tongue through the blanket, the sharpened end of the tongue returning into the groove 16, thus preventing disengagement of the blanket.

It will be apparent that the two ends of the device may be operated independently of each other, as described above, and that when the blanket is to be disengaged it is only necessary to press the tongue down with the fingers and to slide the blankets therefrom.

What is claimed is—

1. A blanket-fastener comprising a member having its ends curved upwardly and inwardly and having grooves in the under sides of its curved portions, the free ends of said curved portions being spaced from each other, an upwardly-extending bracket connected with the member intermediate of its ends and lying between the free ends of the curved portions, and oppositely-extending spring-tongues secured at one end to the bracket and having their free ends sharpened, said tongues lying with their sharpened ends in the grooves of the curved portions.

2. A device of the class described comprising two metallic rods having their inner ends turned upwardly at right angles thereto, said upwardly-turned portions being disposed side by side and secured together, the upper ends of said upwardly-turned portions being spaced laterally from each other, said rods extending in opposite directions and having their free ends curved upwardly, curved fingers secured to the free ends of the rods and extending inwardly thereover in the direction of the meeting ends of the rods, said fingers having grooves in their under faces, and a helical spring mounted between the spaced portions, the ends of the wires of which the spring is formed extending in opposite directions and having their extremities sharpened, said sharpened extremities lying in the grooves of the fingers.

In testimony whereof I affix my signature in presence of two witnesses.

SAMUEL GALLOWAY.

Witnesses:
 E. E. COULTER,
 STELLA TOPE.